INVENTOR:
FREDERICK J. Hodge
By Smyth, Roston & Pavitt
Attorneys

INVENTOR:
FREDERICK J. Hodge
By Smyth, Roston & Pavitt
Attorneys

United States Patent Office 3,446,914

Patented May 27, 1969

3,446,914

AUDIO AND VIDEO RECORDING WITH PHASE MODULATED AUDIO PULSE ON HORIZONTAL BACK PORCH

Frederick J. Hodge, Camarillo, Calif., assignor to Minnesota Mining and Manufacturing Company, St. Paul, Minn., a corporation of Delaware Filed Oct. 12, 1965, Ser. No. 495,262
Int. Cl. H04n 5/76, 7/00
U.S. Cl. 178—6.6 8 Claims

ABSTRACT OF THE DISCLOSURE

A system for recording and reproducing sound together with video signals by placing pulses on the back porch of the horizontal sync signals having phase modulation relative to the leading edge of each such sync signal and continuing the modulation through the vertical sync period.

The present invention relates to a system for processing information signals, particularly of the type in which signals are first prepared for recording, then recorded on a suitable storage carrier and subsequently retrieved from the storage carrier during playback operation for subsequent use. More particularly, the invention relates to a system which serves to combine different types of information into a single train of information which permits single track recording.

For example, in the field of video signal recording, preferably using a disk as storage carrier, there always is the problem that the respectively associated sound signals must also be recorded. One can, of course, use a second track for purposes of recording the sound whereby, for example, video and sound tracks run in parallel. However, this is very uneconomical because the required band widths for video and audio information differ widely. The information density of the video track is determined by the recording speed and the video band and is the principal factor which determines and limits the storage capacity of any given storage carrier. A parallel sound track must be correlated in time to the video track, but requires a much smaller frequency band so that the information density on the sound track is considerably below the maximum density permissible on the particular carrier. Thus there is a considerable waste in recording space.

The invention now is concerned with and relates particularly to the problem of combining video and audio information so that it can be recorded on a common track, and the capacity of a given storage medium can thus precisely be doubled. Here it is of importance to consider that the video information includes the camera signal containing the video information proper and control signals such as the horizontal and vertical sync pulses and equalizing pulses. The format of these signals is a fixed one because a recording, of course, has to be made so that the conventional television equipment can be used for playback or reproduction; in other words the recorded signal must have a compatible format with the standard type of television signals.

These control pulses are rectangular pulses varying between two signal level amplitudes which are in a range outside of the range used for video information proper. The characteristic and distinguishing features of the control pulses are duration, repetition rate, and phase. For example, the horizontal sync pulses recur in the video signal at a rate of 15,750 c.p.s.; this rate of recurrence is suitable to be regarded as a carrier type frequency because the audio information as conventionally used for television reproduction is considerably below that frequency.

The invention is now specifically concerned with a system which permits the introduction of signals representing audio information, into the control pulses and in a manner which does not disturb the control function which is to be carried out by these control pulses. Herein, it is to be taken into consideration that, as stated, the signal range of the control pulses differ from that of the video information proper. The sync pulses usually extend from what is called the black level to the blacker-than-black level. Furthermore, the several control signals which appear during the control pulse periods are not visibly reproduced upon playback of the video recording.

The system, therefore, which is the object of the present invention includes the following novel features and aspects for combining different signals, for example, representing audio and video information, for purposes of concurrent recording and in a mutually non-interfering manner as far as a subsequent utilization during retrieval or playback is concerned. The first step in providing for the system is the selection of a particularly recurring characteristical feature in one of the signals, for example in the video signal, and which recurs at a precise rate. Herein it is of importance, that video information is comprised of alternating portions constituting intelligence such as the camera signal, and control portions such as the blanking periods with superimposed sync pulses. For example, the horizontal sync pulse rate of 15,750 may be selected as the repetition rate of interest and a particular feature is sought which has no phase displacement throughout the entire train of video signals. In this particular characteristic one can select the leading edge of the horizontal sync pulses. During the signal period outside of the vertical blanking period the horizontal sync pulses recur at a precise rate, and their leading edges follow at precisely a mutual time displacement of 63.5 microseconds. These pulse edges are continued at that rate and into and through the vertical blanking period, even though they do not pertain to horizontal sync pulses during the vertical blanking period. Thus, taking any leading horizontal sync pulse edge, one finds that after every 63.5 microseconds another such leading edge occurs throughout the entire video signal. This leading edge is specifically defined as a drop in signal level from the black level to the blacker-than-black level.

These instants as recurring at a fixed cycle rate are used as reference points in time. The audio information is sampled approximately at each of such recurring instants, and a pulse is formed having a duration which is representative of the instantaneous amplitude of the audio information at the time of sampling. The leading edge of each of these pulses as resulting from sampling bears a fixed time relation to the recurring leading edge pulse as previously selected for reference, while the trailing edge of such a pulse as resulting from sampling, varies in accordance with the audio information sampled. The pulses thus produced have a width within a range of permissible width variations corresponding to a sampling range. This pulse width range is selected so that the respective trailing edges always will fall in the "back porch" of the horizontal sync pulses. This particular interval as a range within which the trailing edge of a sampling pulse may appear, is continued and available throughout the vertical blanking period.

The trailing edges of the sampling pulses are now used for the production of representation pulses of very short duration and to be inserted into the video signal. These pulses of short duration have an amplitude, preferably a fixed amplitude, which extends way into the range usually occupied by the video signal proper, i.e., the camera signal variation range. These audio representing pulses are "white spikes" extending above the black level. Thus, the inclusion of these pulses into the control pulse period does not impair the control function of the sync pulses because the control results substantially only from detection of the black and the blacker-than-black levels, while signals having amplitudes which extend into the white range are suppressed by the control signal evaluating networks. On the other hand, the "white spikes" which appear now during the horizontal blanking period and at particular times during the vertical blanking period do not interfere with the regular reproduction of the video signal, because these white spikes simply do not appear on the video screen.

The combined signals, i.e., the regular video signal together with the sound or audio representing "white spike" are then recorded on a single track. During playback the signal in toto can be passed into the normal video processing apparatus whereby the "white spike" will not interfere with the production or reproduction of the video signal proper. Particularly, since the white spikes are to be of very short duration they do not interefere with the integration process which is involved in the formation of the vertical sync pulses.

The audio is now retrieved in the following manner: First, means are provided to respond to the particular characteristic which is used as time reference, i.e., the black to blacker-than-black pulse drop edges as they recur at times apart by precisely 63.5 microseconds. These recurring instants or phases within the video signal train are then used to operate a "window" generator comprised of a gating network which is opened up for a period of time during which a white spike may occur. This "window" is in effect a signal having a fixed time relationship to the characteristic, leading edge phase of the horizontal sync pulses as continued throughout the vertical blanking period, and the window is a time interval of fixed duration. The white spike pulses will occur in these time intervals, but at a variable phase with respect to the respective time reference used to generate the "window." This variation is in effect the varying audio signal. By way of integration and filtering, particularly for removing the 15,750 cycle rate, the audio signal can be restored.

The invention finds utility beyond the field of recording-reproducing systems. Wherever only a single transmission channel in the general sense is available, one can use this technique of superimposing audio upon video for concurrent transmission. It should be noted that the system differs from conventional multiplexing, as the video signal is not "chopped" in any manner.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
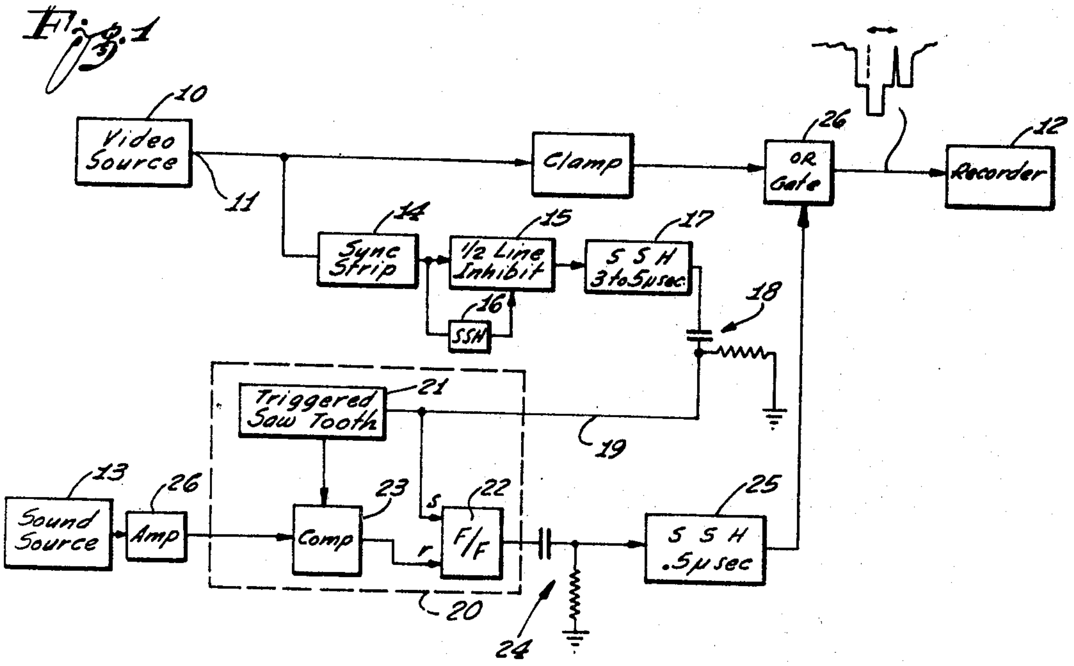
FIGURE 1 illustrates a block diagram of the recording control network providing for a suitable combination of video and audio signals for concurrent recording in accordance with the teaching of the present invention.

Proceeding now to the detailed description of the drawings, in FIGURE 1 thereof there is shown the recording portion of the inventive system. Reference numeral 10 designates a general source of video signals. Conveniently, this source may be a video camera or a motion picture reproducing device with the scanner having an output line 11 to furnish thereto a complete video envelope signal including video information proper or camera signal and all necessary sync signals including horizontal and vertical sync pulses. This video signal is ultimately to be passed to a video signal recording device 12, for example, a recorder using a photographic disc or the like as storage carrier to record thereon the video signal along a spiral track. Recording systems of this nature have been disclosed, for example, in application Ser. No. 181,392, filed Mar. 21, 1962, and now abandoned and having common assignee.

It is the purpose of the invention to provide for a concurrent recordation of signals representing audio information to be recorded on the same recording medium without requiring a separate recording track. A source 13 for sound or audio is likewise presumed to be of a general nature, i.e., it may be a microphone concurrently operated with a television camera that observes the scenery, but it is well within the scope of the invention that video and audio signals come from different sources, and the audio is "mixed" with the video signal. Thus, the inventive concept includes the possibility that source 10 is a temporary storage carrier of video signals, while 13 is a temporary audio storage carrier, and both types of signals are reproduced presently for purposes of adding the sound signals to the video signals so as to form a composite recording on a single storage carrier; this combining is the principal purpose and object of the inventive system.

Next, there is provided a so-called sync stripper 14 which specifically responds to the sync pulses as they appear in line 11. It should be noted that any known sync stripper can be used for this purpose. The principal objective of this device 14 is to detect the instants when in the composite video signal in line 11 there appears a transition from the so-called black level to the so-called blacker-than-black level. This is the leading edge of a sync pulse, and it is the occurrence of the instants of such leading edges which is of importance in the present invention.

Thus, the sync stripper 14 may simply be a unidirectional differentiating network with input threshold behavior which responds to the change from black to the blacker-than-black signal level of the signal which passes through line 11. Specifically, the input side of stage 14 will be biased to suppress any signals "whiter" than the black level.

It is now necessary to briefly consider the format of the sync pulses as they appear in the composite video signal. The composite video signal during transmission of a picture in the usual line by line format includes horizontal sync pulses having a duration of about 5 microseconds and a repetition rate of 15,750 c.p.s. corresponding to 63.5 seconds mutual time displacement.

Figure 2:
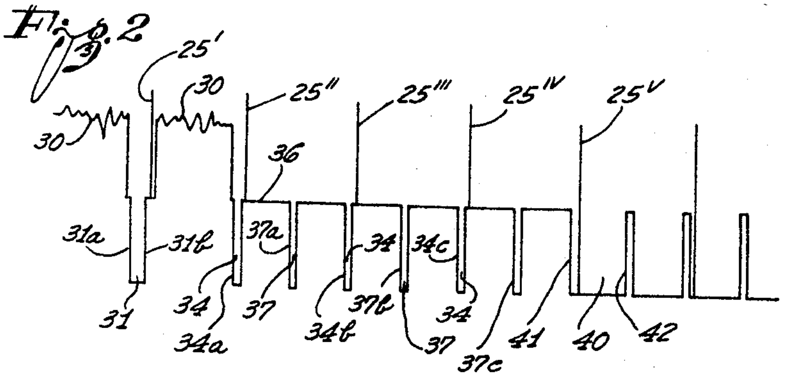
FIGURE 2 illustrates a timing diagram of the last two lines of a video signal and the first portion of the vertical blanking period showing the "white spikes" superimposed upon the regular video signal train.

FIGURE 2 illustrates a portion of the composite video signal. Reference numeral 30 denotes the camera signal portion of the last two lines separated by a horizontal sync pulse 31. The horizontal sync pulses are in a sense continued into the so-called vertical blanking interval but at a smaller width and to serve as equalizing pulses 34. The equalizing pulses, however, appear at twice the rate of the horizontal sync pulses, so that there are pulses 37 alternating with the pulses 34 at a rate of 31.5 kc.p.s., whereby only the pulses 34 continue the horizontal sync pulses in precise phase relationship to them. During the vertical sync pulse interval there appear vertical sync pulses such as 40 of a width almost equal to half a picture line width and separated by pulses approximately equal to the horizontal sync pulses but of reverse direction as between the two black levels of interest. The vertical sync pulses have precisely the repetition rate of the equalizing pulses which is 31.5 kc.

Significantly now, throughout the video signal one can find pulse flanks (34*a*, 34*b*, 34*c*, 41, 41*a*) which are apart by precisely 63.5 $\mu$sec, regardless of the duration of the particular pulse to which such flank or edge pertains, and irrespective of the fact that during the vertical blanking period an additional flank of like orientation (37*a*, 37*b*, 37*c*, 42 . . . ) is interspaced half way in between each two such selected pulse flanks.

All these enumerated pulse flanks are defined by a sharp signal drop from the black to the blacker-than-black level, and the selected ones are selected and used in the circuit to be described next. It is convenient to speak of the pulse flanks or leading edges of interest, as constituting a particular characteristic of the video signal that recurs at a precise cyclic rate, here at the horizontal sync pulse repetition rate of 15,750 c.p.s. and at very precisely defined instants of time (phase). This characteristic is monitored by the network 14, responding, as stated to signals below the black level and causing unidirectional differentiation to detect any instant when the signal level drops to the blacker-than-black level. Thus, during the camera signal period, a pulse train will appear at the output of device 14 having a rate frequency of 15,750 c.p.s. each pulse being of short duration.

During the vertical blanking period the repetition rate of these differentiating pulses is doubled. It is thus necessary to remove the interspaced pulses, i.e., every other sync pulse of the 31.5 kc. pulse train as it now appears during the vertical blanking interval is to be suppressed, to strictly continue the pulse train of 15,750 c.p.s. through the vertical blanking interval.

There is thus provided a gate 15 whose function is to remove the undesired pulses. This selective gating and suppression can be carried out, for example, in a manner that a single shot or monovibrator 16 when in its stable state responds to pulses from sync stripper 14, preferably at a slight delay. The single shot 16 has an astable state or astable period of time in excess of 31.75 microseconds but shorter than 63.5 microseconds. During any astable period as succeeding a delayed input, single shot 16 provides for a signal that blocks or inhibits gate 15. Any additional input signal applied to the input side of single shot 16 during the astable period is of no avail, while any pulse effectively triggering single shot 16 will have passed slightly earlier through the then uninhibited gate 15.

The gate 15 will thus be blocked during every other pulse occurring during the vertical blanking period, such blocked pulses being derived from an interspaced leading edge of either an equalizing pulse or of a vertical sync pulse. The signals or pulses permitted to pass through the gate 15 are signals which are indicative of the leading edge of all horizontal sync pulses at the 15,750 cycle rate as continued at the same phase in the vertical blanking period.

The pulses which pass through gate 15 will be used to trigger a single shot or monostable multivibrator 17 having preferably an adjustable unstable period of 3 to 5 microseconds. The purpose of this delay will be described below. The output pulse from the single shot 17 is passed to a differentiating stage 18 necessarily producing a positive pulse spike at the time of response of the single shot 17 which spike practically coincides with the pulse permitted to pass gate 15, there may be a negligible delay due to the finite transition time in the electronic components. The negative spike following 3 to 5 microseconds later is passed into a line 19, for example, 4 microseconds after this leading edge, to trigger a pulse width modulator 20.

The information input for modulator 20 is provided by an amplifier which has its input connected to the audio signal source 13. The negative pulses in line 19 serve as sampling signals for then existing instantaneous amplitude value as provided by amplifier 26. The amplifier 23 preferably is a so-called pre-emphasizer which takes into consideration that within this system and as a result of subsequent recording the higher frequencies are somewhat more attenuated than the lower ones so that the amplification characteristics in amplifier 26 may have a higher gain for higher audio frequency. In general, modulator 20 provides a sampled pulse for each negative spike entering it through line 19, such pulse having a width representative of the amplitude of a signal as derived from amplifier 26. Pulse width modulators, in general, are known and the circuit does not require elaboration. As a representative example, this modulator 20 may comprise an astable sawtooth type generator 21 which is triggered from the negative sampling pulse in line 19. Again, a single shot can be used for this purpose, as inherently a substantially linear rising signal voltage is developed within a monovibrator.

Such rising signal is usually the voltage of a charging capacitor, linearity of rise can be ensured by constant current means through which the charging current flows. The linear increasing output of single shot 21 is used as the generated sawtooth wave. The single shot 21 returned to the stable state after a time which in effect correspond to the maximum width of possible or permissible modulation.

This modulator 20 may then include in addition, a comparator 23 which compares the instantaneous amplitude of the output signal of amplifier 26 with the amplitude of the sawtooth wave. The comparator may be a low level Schmitt trigger. The trigger or comparator 23 is in one state as long as the instantaneous output of amplifier 26 is below the rising sawtooth wave derived from a single shot 21. As soon as the output of single shot 21 traverses the signal level of the amplifier output, trigger-comparator 23 attains or assumes a second signal output level or state.

Figure 3:
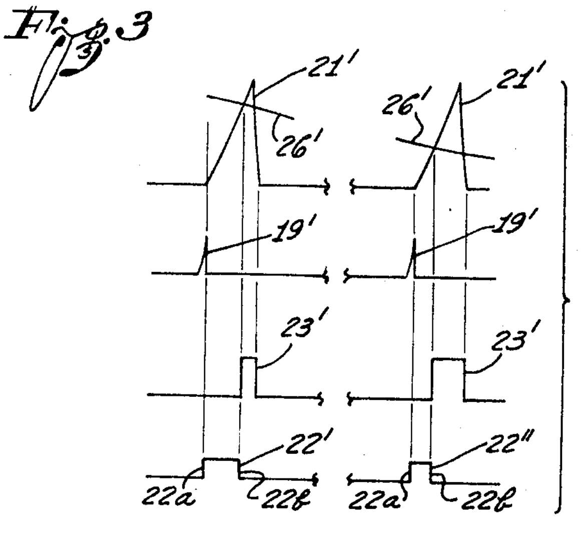
FIGURE 3 illustrates four time diagrams in correct phase relation showing the production of the white spikes.

FIGURE 3 illustrates on the top line output pulses 21′ of sawtooth generator 21, and superimposed is the trace 26′ representing an example of an output of amplifier 26. Here it should be recalled that the pulse rate of the pulse 21′ is also 15,750 c.p.s.—well above the usual audio range transmitted for example in radio. Trace 26′ represents an audio signal. The second line in FIGURE 3 shows the pulse train in line 19, and the third line shows blocks 23′ representative of the output of comparator 23.

The pulses in line 19, additionally, set a flip-flop 22 which is reset by the output pulses of comparator 23, particularly the leading edges thereof; the lowest line in FIGURE 3 shows the resulting output pulses 22′ of flip-flop 22 which are in effect pulse width modulated. A leading edge **22*a* of a pulse 22′ occurs at an instant of occurrence of a negative spike in line 19 which is indicative of the commencing rise in the sawtooth generator 21 in modulator 20. Whenever the amplitude of signal 26′ is substantially equal to the sawtooth wave amplitude, the Schmitt trigger or comparator 23 resets flip-flop 22 and thereby defines the trailing edge 22*b* of the information pulse 22′**.

The leading edge **22*a* of this pulse 22′ will appear at a fixed delay, as selected by single shot 17, from the leading edge of a selected horizontal sync pulse in the video information as passing through line 11. The trailing edge 22*b* of this pulse is an information carrier, referenced to the leading edge 22*a* and indicative of the amplitude of the signal 26′** which is the amplified audio.

It will be appreciated that the pulse modulator 20 recurs at the 15,750 cycle rate thus operating as carrier. The information which the entire modulating system is capable of transmitting is limited to about 4 to 5 kc. which is commensurate with the audio range of commercial television.

A differentiating network 24 is connected to the output side of flip-flop 22 or, more generally, of modulator 20 and thus responds to the pulses 22′ as they leave the modulator 20. Again, the negative spike of this differentiation is used at this point, as it is of interest only to detect the instant of occurrence of the trailing edge **22*b* of an information pulse 22′ and this occurrence is the information content proper. The negative spike as resulting from the differentiated trailed edge of pulse 22*b* is used to trigger a single shot multivibrator 25 which furnishes a pulse of very short duration, i.e., of about .5 microsecond. This pulse is to have a rather high amplitude, and in its most convenient and safest form is to have an amplitude which goes up to the maximum white level of the video signal. Thus, the output pulses 25' of this monovibrator 25** are what was called above, the "white spikes."

These signals 25' are passed to an "or" gate type assembly 26 as one input thereof, and "or" gate 26 receives additionally the video signal in line 11 as the other input. The "or" gate 26 is an algebraic adder in that it passes that one of respective two signals as applied to its two inputs which has the higher ("whiter") amplitude. Thus, the .5 microsecond lasting "white spikes" and representing audio information are mixed into the video signal to thereafter appear on the so-called back porch of the horizontal sync pulse blanking period. The width of this porch determines the maximum width of the pulse 22.

The reason for the provision of the various elements in the selected format requirement, particularly the reason for providing the delaying device 17 can be understood best with reference to FIGURE 2. As stated above, FIGURE 2 illustrates a portion of the last two lines of video information 30. There is a horizontal sync pulse 31 with a leading edge **31*a* and the trailing edge 31*b*. The pulse width is approximately 3–5 microseconds which is the controlling factor for the time adjusted for single shot 17. The horizontal sync pulses appear during somewhat longer horizontal blanking periods established at black level, and thus each sync pulse is followed by what is commonly called the back porch 32. On this back porch, there appears now a white spike or sound modulator pulse 25' which is representative of the pulse furnished by single shot 25**.

The instant **34*a* marks the beginning of the vertical blanking interval coinciding with the first equalizing pulse 34**. This equalizing pulse, however, has about half the width of the horizontal sync pulse proper. This is one reason why the modulator output signals are referenced in time to the leading edge of the sync pulses. Only the leading edges of the horizontal sync pulses and of every other equalizing pulse follow each other at the precise interval of 63.5 μsec. representing the carrier frequency of 15,750 c.p.s. used here. As to the trailing edges, there is a phase jump from the last horizontal sync pulse to the first equalizing pulse, which would appear as a 60 c.p.s. hum.

The next sound modulator pulse 25'' occurs from the leading edge **34*a* at a time which is equal to the time adjusted in single shot 17 plus the width of a pulse 22' the trailing edge of which caused insertion of this particular pulse 25''. During and following this pulse 25'' there is a blanking interval 36 at black level followed by an equalization pulse 37, the leading edge 37*a* of which follows the leading edge 34*a* of the first blanking pulse 34 at a time which corresponds to a 31.5 kilocycle rate. Thus, this pulse 37 is eliminated by inhibition in gate 15**, it is not to be used because it is inadvisable to employ a carrier of variable frequency.

The next equalizing pulse 34, particularly the leading edge **37*b* thereof, follows the first equalizing pulse, particularly the leading edge 34*a* thereof at the 15,750 cycle rate. Therefore, a modulator output represented by a white spike 25''' is being inserted and stacked upon the black blanking level 36. Pulse 25**$^{IV}$ is produced in an analogous manner.

Numeral 40 denotes the first vertical sync pulse. It has a leading edge 41 and a trailing edge 42 which follows the leading edge almost, but not quite, half a line width after the leading edge. Thus, the time from the trailing edge of the last equalization pulse followed by a modulator pulse, to the trailing edge of the next vertical sync pulse is almost one and a half line width. This is the principal reason for using the leading edges of the various pulses for time reference of the added modulator pulses. A modulator pulse 25$^{V}$ is inserted here and referenced to the leading vertical sync pulse edge 41 to appear during the period of the vertical sync pulse, which does not constitute a disturbance due to the short duration of the modulator pulse here inserted.

Thus, the signal that is recorded by the recorder 12 includes the video with all its necessary synchronization and control pulses, and in addition, it includes a signal represented by a sequence of "white spikes" appearing at a rate averaging 15,750 c.p.s. and being delayed from the leading edge of the horizontal sync pulses and corresponding leading edges of equalizing and vertical sync pulses in the vertical sync interval.

These signals are pulses of short duration carrying audio information in terms of delay. The information itself is contained in the varying time intervals: **31*a*–25'; 34*a*–25''; 34*b*–25'''; 35*c*–25$^{IV}$; 41–25$^{V}$ etc. Thus, the signal that is recorded by means of the recording device 12** includes the video signal and superimposed audio information which does not require a separate track and permits faithful reproduction of sound up to 4 to 5 kc. which is sufficient for the desired information fidelity.

It is significant that the recordation of the sound does not impair in any manner the video information content, or does it distort the same, nor is any detrimental influence introduced into the signal train rendering the control pulses ambiguous or otherwise unusable, as for control proper clamping will occur at the black level eliminating the white spikes in the control network used for video playback. The sound is recorded in a manner which makes available otherwise unused signal information and recording space, as defined by black level pulse periods.

Figure 4:
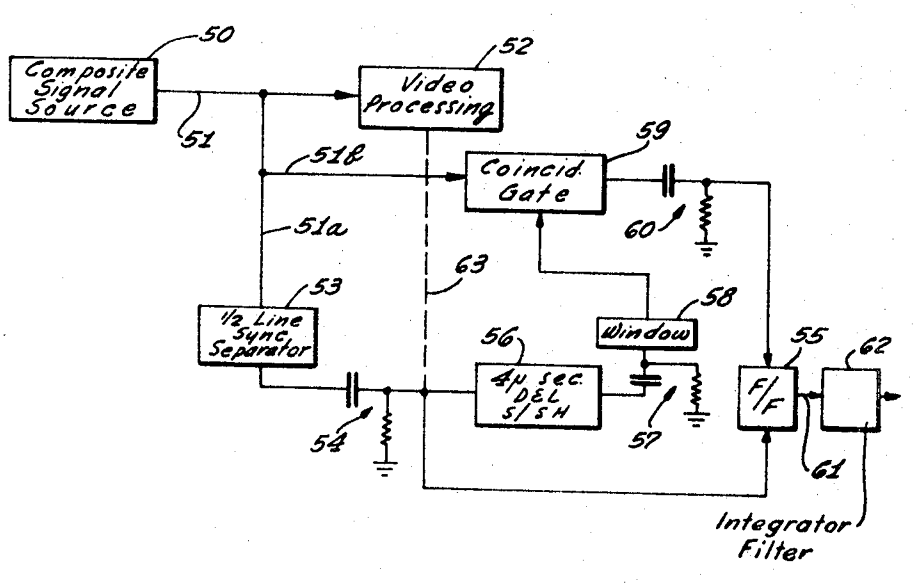
FIGURE 4 illustrates schematically a network used for the retrieval of audio information when recorded with a system, an example of which is shown in FIGURE 1.

We proceed now to the description of FIGURE 4 which illustrates schematically the system enabling the reproduction of the recorded sound. Reference numeral 50 indicates a signal source of general nature, but specifically it will be a reproducing device which scans the signal or information recording track produced as previously described. Thus, source 50 may include an electro optical detector scanning the spiral track on a photographic-video disk and producing an electrical signal representative of the recorded information which includes video information with audio superimposed as described above.

This electric signal of reproduced information is furnished at the output side or channel 51. Thus, the signal train which appears in line 51 includes the camera signal, the control signals such as the sync signals and the sound modulator signal identifiable as "white" signal spikes and appearing at certain time intervals after a drop in signal level from the black to blacker-than-black level has occurred. The video signal is passed to a video processing network 52 of general design and may be a television monitor or a home television receiver, whereby specifically the line 51 may connect to the output side of the IF Detector of a conventional television set which thus should be provided with a jack that permits such connection. Further processing of the video signal is of no present concern and it suffices to state that the sound representing pulse is not further used and does not disturb the processing of the video signal.

The system shown in FIGURE 4 now is specifically designed to detect the occurrence of this sound representing signal, referencing it in time against the black to blacker-than-black signal edges, and reproducing audible sound. This sound signal restoring circuit is autonomous in the sense that it does not require any concurrent video signal processing so that network 52 can actually be omitted or disconnected if one wants to play back only the sound recording of the composite recording. However, it will be explained below that concurrent reproducing of audio and video permits a simplification of the circuit.

A network 53 receives the video signal via a branch line **51*a* connected to the line 51 which interconnects the video playback system 50 with the processor 52. Network 53 may comprise a combined sync stripper and half line gating network as was described above, so that at the output side of network 53, there will appear signals having a leading edge coinciding with the black to blacker-than-black video signal edges as they recur at a 15,750 c.p.s. rate. The duration of a signal of the output side of network 53 is not important as only these edges are to be detected. A differentiator 54 responds to the initial edges and provides a trigger signal at precisely a 15,750 c.p.s. repetition rate. This trigger signal is used twofold. First, it is used to set a bistable device 55 such as a flip-flop. Thus, flip-flop 55** is set with each of the 15,750 c.p.s. rate leading edges of the horizontal sync pulses as continued into the vertical blanking period.

The output pulse of differentiation 54 is used additionally to actuate a single shot or monovibrator 56 having an adjustable, unstable period, and it thus corresponds in its adjustment to the single shot 17 in FIGURE 1. During its unstable period single shot 17 provides a pulse of a duration within the range of 3 to 5 microseconds, and in the normal case this will be about 4 microseconds. Any output pulse furnished by the drive pulse generator 56 has rectangular shape and its edges are specifically detected by the differentiator 57; the trailing edge peak which occurs about 4 microseconds after the leading edge of any sync pulse which is permitted to pass the gate 53, is used to trigger a second monostable multivibrator 58, having an unstable period equal to the maximum duration a pulse 22' may have. It will be recalled that the pulses 22' are the pulse width modulated signals, produced in the network 20 shown in FIGURE 1.

This multivibrator 58 can also be described as a "window" generator because it produces a pulse which defines a time interval as an operating period during which a sound or audio modulator pulse must occur. Basically, the window generator 58 provides for a signal block or detecting pulse having a duration and occurrence coinciding with the back porch of a horizontal sync pulse and analogous time intervals during the vertical blanking period. The output pulse of the window generator 58 is passed to the gating terminal of a coincidence gate 59 which receives at its signal input side the video signal in line 51 tapped off via branch line 51*b*. The signal input side of the coincidence gate 59 may be biased to disregard or suppress signals in the black and any lower level so that at the output side of gate 59 only the audio modulating pulse will appear as a distinctive signal which is gated through the gate 59; in terms of video information this pulse will be a white spike or peak of .5 microsecond duration. A characteristic white pulse or spike will appear only during the gating-open period of gate 59 as determined by the duration of the signal from window generator 58.

Figure 5:
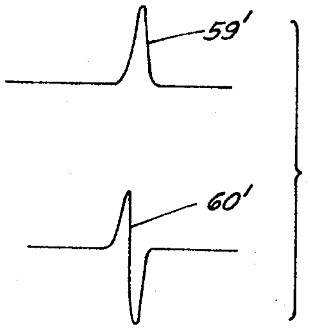
FIGURE 5 illustrates two time diagrams showing particulars for a white spike pulse as it may appear after reproduction.

Here now it must be considered that some signal distortion must be expected. The pulses 25' as inserted into the video signal to be recorded (see FIGURE 1) are sharp, rectangular pulse of .5 $\mu$sec. This represents a signal fundamental of 2 mc. and sharp edges require up to $10^2$ mc. faithful bandpass behavior of the entire transmission system from recording to reproduction. For economic use of recording space, this is not attainable. Thus, the sound representing white spikes as they appear in line 51 and as passed through the "window" gate 59, may have a waveform as shown in the upper line of FIGURE 5. The leading and trailing edges of such a pulse 59' will have contour characteristics which depends on numerous factors in the entire system, which may even vary in time. However, the peak of this pulse 59' will invariably have the same relatiive location in the signal train as had the center of an inserted pulse 25' during recording. The peak of the reproduced white spike may be more or less sharp or rounded, but its location is fixed in time in relation to any other signal components in the video signal. Thus, upon differentiating such a pulse, the edge 60' or flank representing the peak of a pulse 59' will have a definite time relationship and will now be used to specifically mark occurrence of the sound representing pulse.

It should be mentioned briefly that the leading edge of the sound representing pulse 25' when produced for purposes of recording (undistorted at that instant) represented specifically the audio information. Using now the center of the corresponding pulse after reproducing introduces no error, as this is a fixed additional delay recurring at a 15,750 c.p.s. rate and after demodulation (to be described) only a D.C. component will result therefrom.

The differentation of pulse 59' is carried out by a differentiator 60, and the output is used to reset flip-flop 55. The connection is made so that the resetting occurs indeed at the edge 60'. Thus, the flip-flop 55 remains set for a period of time equal to the time that elapses from occurrence of the leading edge of a horizontal sync pulse at 15,750 cycle rate, up to the time of appearance of the center of an audio representing pulse. The output side 61 of the flip-flop 55 thus receives a signal train which is comprised of such pulses. The leading edges of these pulses are precisely apart at the 15,750 rate, i.e., by 63.5 microseconds, while the trailing edges appear at a variable rate so that the signal train in line 61 is in fact a restored pulse width modulated signal train, the modulation representing the audio signal as it was sampled originally.

Each pulse in line 61 does not correspond to the pulses 22' at the recording side of the system, but includes the fixed delay as introduced by single shot 56 as well as half the pulse width of each audio representing pulse. Together, these fixed delays form a constantly recurring pulse width-value representing only the 15,750 carrier cycle rate without distorting the audio information additionally included in the occurrence of the trailing edge of each pulse in line 61. An integrator 62 receives the signal train in line 61. This integrator has a time constant which, in fact, causes demodulation of the 15,750 c.p.s. carrier to establish any suitable DC level. Superimposed upon this DC component then appears the audio modulation.

An AC output circuit of the integrator demodulator may include a low pass filter with a cut off frequency below 15,750 c.p.s. to eliminate the carrier, and after suitable amplification the audio signal can be reproduced audibly by conventional means.

The circuit shown in FIGURE 4 is primarily designed as an auxiliary audio attachment for a system that may include a conventional home television set and a video disk or tape reproducing device 50. The particular output channel 51 of the playback device is then used additionally for detecting and utilizing sound signals recorded on the same disk or tape in a format as was explained with reference to FIGURE 1. The network shown in FIGURE 4 may be incorporated directly in the disk or tape playback system, and the integrator-filter 62 may have its output connectible to the speaker amplifier in the TV set.

The degree of incorporation of the disk or tape reproducing network into an otherwise existing video signal processing system is not of principal concern but an economic aspect. However, it shall be briefly explained that a combined unit can be simplified as far as the audio detection is concerned and as was mentioned above briefly.

The picture tube scanning device in the network 52 incorporates already sync separation means; moreover the instants of retrace of the flying spot mark the occurrence of the characteristic leading edge pulses throughout the entire video sequence. There are several points in a video tube scanning control where these instants can be detected as distinctive electrical signals, for example, at the yoke or the damping circuit. The dotted line 63 symbolically represents a tap line which derives from the video processor 52 a pulse train at a 15,750 c.p.s. cycle rate and having a phase coinciding with or having a fixed phase angle to the leading horizontal sync pulse edge as continued into the vertical blanking period in a manner defined above.

In this case the line 51*a* and the separator with half line inhibiting gate 53 can be omitted, omission of the differentiator 54 depends on the tapping point of line 63 in processor 52. The line 63 provides for the input signal of both the set-side input terminal of flip-flop 55 and the input terminal of monovibrator 56.

The invention is not limited to the embodiments described above but all changes and modifications thereof not constituting departures from the spirit and scope of the invention are intended to be covered by the following claims.

I claim:

1. Recording device for video and audio signals comprising:

first means for providing a composite video signal for recording;

second means responsive to the black-to-blacker-than-black swing, being the leading edge of each horizontal sync pulse as included in the composite video signal, to provide a periodically recurring gating signal having characteristics to coincide with the back porch as succeeding each horizontal sync pulse;

third means for providing a signal representing audio information to be recorded;

fourth means connected to the third means for being responsive to said audio signal for providing a pulse train, each pulse thereof having a phase relation to the beginning of one of said gating signals, which phase relation is representative of the audio signal, such phase relation being selected that each such pulse occurs earlier than the video information proper that succeeds the sync signal the particular characteristic of which resulted in said latter gating signal;

fifth means connected to the first and fourth means for introducing each said pulse additionally into the composite video signal; and means connected to the fifth means for recording said video signal including said pulses as introduced.

2. Recording device for video and audio signals comprising:

first means for providing a composite video signal for recording;

second means responsive to the black-to-blacker-than-black swing, being the leading edge of each horizontal sync pulse as included in the composite video signal to provide a periodically recurring gating signal having characteristics to coincide with the back porch as succeeding each horizontal sync pulse;

means connected to the first and second means to inhibit operation of the second means in response to a black-to-blacker-than-black signal swing earlier than for the horizontal sync pulse line frequency period after a blacker-than-black swing having followed others at the rate of the horizontal sync pulses;

third means for providing a signal representing audio information to be recorded;

fourth means connected to the third means for being responsive to said audio signal for providing a pulse train, each pulse thereof having a phase relation to the beginning of one of said gating signals, which phase relation is representative of the audio signal, such phase relation being selected that each such pulse occurs earlier than the video information proper that succeeds the black-to-blacker-than-black signal swing which caused production of said latter gating signal;

fifth means connected to the first and fourth means for introducing each said pulse additionally into the composite video signal; and means connected to the fifth means for recording said video signal including said pulses as introduced.

3. An apparatus for processing information for recording, comprising:

first means responsive to particular recurring characteristics of a first train of information to be recorded, to detect the instants of occurrence of said particular characteristics;

second means connected to the first means to provide signals indicative of the detection of the particular characteristics;

third means responsive to the particular recurring characteristics of the first train of information, and connected to the second means to inhibit production of the signals when the first means responds to occurrence of said particular characteristics at phases other than given by a fixed repetition rate;

fourth means responsive to a second sequence of information having a frequency range of interest below said repetition rate;

fifth means connected to the second and fourth means for being responsive to said detected characteristics and sampling said second information in relation to the instants of occurrence of the detected and uninhibited first characteristics, and to provide signals having timed relation to said latter instants of occurrence, which timed relation is representative of said sampled information; and means connected to the fifth means for superimposing said signals as provided by the fifth means as distinctive characteristics upon said first train of information.

4. Recording device for video and audio signals comprising:

first means for providing a video signal for recording;

second means connected to the first means for being responsive to occurrence of a particular characteristic of control signals included in the video signal to provide a periodically recurring timing signal;

third means connected to the first and second means for inhibiting the production of the timing signal by the second means if the particular characteristic occurs at a rate other than the rate of the horizontal sync pulses;

fourth means for providing a signal representing audio information to be recorded;

fifth means connected to the second means for providing a pulse train the width of any pulse being referenced with one edge to one of said timing signals, the other edge representing the instantaneous amplitude of said audio signal in relation to the one timing signal;

sixth means connected to the fifth means for producing a signal having a timed relation to said particular characteristic, and being representative of the width of one of such pulses as provided by the fifth means; and means for introducing said signal into the video signal.

5. An apparatus for providing information which includes video and audio information, comprising:

first means for providing a video signal which includes the camera signal and control signals;

second means connected to the first means and responsive to a particular recurring characteristic of said control signals to provide a detection signal representative thereof;

third means connected to the first and second means and responsive to occurrence of the particular characteristic outside of recurrence at horizontal line frequency rate to inhibit production of the detection signal;

a source of audio signals;

fourth means connected to the source and to the second means for sampling said audio signal in response to each detection signal as provided by and uninhibited in said second means and providing a pulse of short duration having timed relation to said detected phase representative of the sampled audio signals; and means connected to the first and fourth means for adding said pulse when produced to said video signal and during a time when no camera signal is provided.

6. An apparatus for providing information which includes video and audio information, comprising:
first means for providing a video signal which includes the camera signal and control signals;
second means connected to the first means and responsive to a particular recurring characteristic of said control signals to provide a detection signal representative thereof;
third means connected to the first and second means to render the second means unresponsive to the particular characteristics if recurring at a phase other than the phase as defined by recurrence at the horizontal line frequency;
a source of audio signals;
fourth means connected to the source and to the second means for sampling said audio signal in response to each detection signal as provided by and uninhibited in said second means and providing a pulse of short duration having timed relation to said detected phase representative of the sampled audio signals; and
means connected to the first and fourth means for adding said pulse when produced to said video signal and during a time when no camera signal is provided.

7. In a system for the playback of recorded video signals, the combinatin comprising:
first means responsive to a particular recurring characteristic of said recorded video signals when played back to provide a train of detecting pulses recurring at a fixed repetition rate;
second means connected to be responsive to the particular characteristics when recurring in relation to the respective previous occurrence of the particular characteristic at a phase other than defined by the horizontal line frequency, to inhibit production of the detecting pulses;
third means connected to the first means responsive to said detecting pulses to sample the played back video signal as to the phase of constant width pulse during the detecting pulse; and
means connected to be responsive to the phases of said pulses for demodulating said phases as audio signals.

8. An apparatus for retrieving stored audio information from a composite video signal, comprising:
first means responsive to the black-to-blacker-than-black signal swing in a reproduced composite video signal;
second means connected to the first means to provide a sampling signal of fixed duration and for a time interval succeeding the instant of occurrence of such characteristics;
third means connected to suppress production of the signal for such signal swings not recurring at horizontal line frequency;
fourth means connected to be responsive to each of said sampling signals not suppressed to detect occurrence of a second characteristic of said stored information and having variable time relation to the occurrence of the respective preceding signal swing in response to which said second means produced said sampling signal; and
means connected to said first and said second means and respectively responsive to each pair of detected signal swing and second characteristics as associated therewith through the fourth means and as recurring at said fixed repetition rate to demodulate the variable time relations as audio information.

References Cited

UNITED STATES PATENTS

| | | | |
|---|---|---|---|
| 2,550,821 | 5/1951 | Kharbanda | 178—5.6 |
| 2,624,797 | 1/1953 | Lawson | 178—5.6 |
| 3,335,218 | 8/1967 | Johnson. | |

ROBERT L. GRIFFIN, *Primary Examiner.*
HOWARD W. BRITTON, *Assistant Examiner.*

U.S. Cl. X.R.

178—5.6